June 7, 1938. H. E. PULLEYBLANK 2,119,752
STEERING WHEEL SWITCH
Filed April 21, 1937
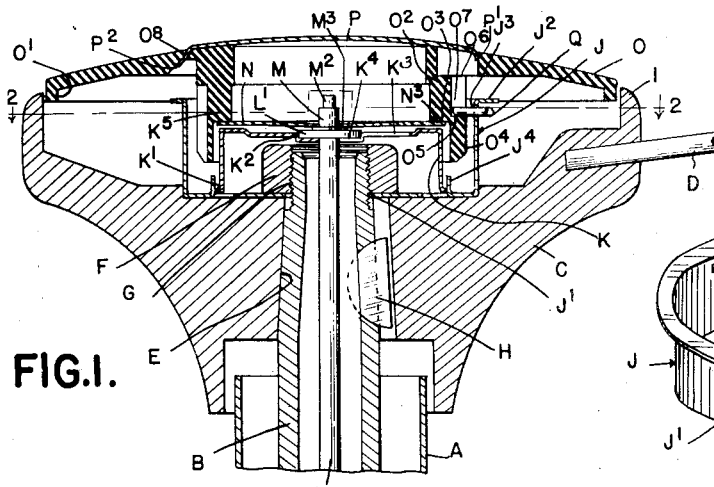
FIG.1.
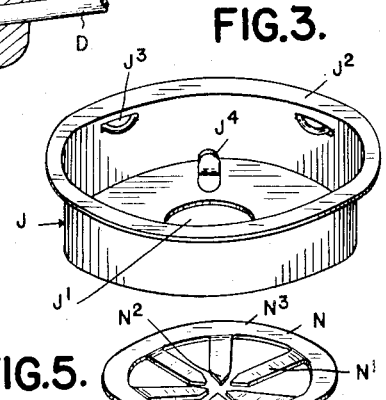
FIG.3.
FIG.5.
FIG.4.
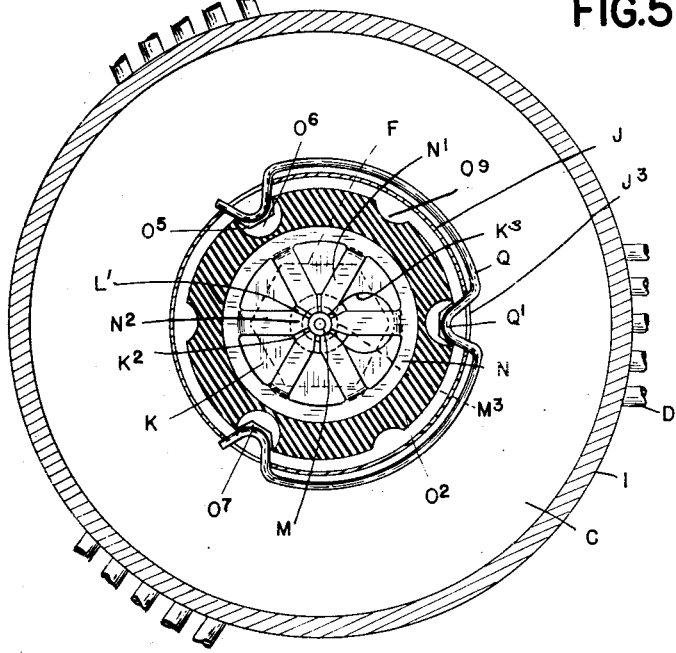
FIG.2.
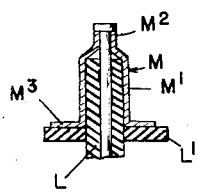
FIG.6.
INVENTOR
HARPER E. PULLEYBLANK
BY
Whittemore Hulbert & Belknap
ATTORNEYS Patented June 7, 1938

2,119,752

UNITED STATES PATENT OFFICE 2,119,752

STEERING WHEEL SWITCH

Harper E. Pulleyblank, Detroit, Mich., assignor to Gemmer Manufacturing Company, Detroit, Mich., a corporation of Michigan Application April 21, 1937, Serial No. 138,274

13 Claims. (Cl. 200—59)

The invention relates to steering wheels and more particularly to the construction of the hub portion thereof and the horn operating circuit closure or what is commonly called the horn button. It is the object of the invention to obtain a construction which permits of accuracy in manufacture; facilitates quick assembly of the parts, and is easily operated with a greater degree of certainty. With these and other objects in view, the invention consists in the construction as hereinafter set forth.

In the drawing:

Figure 1 is a vertical central section through the hub portion of the steering wheel and the circuit closing switch and its connections mounted therein;

Figure 2 is a section on line 2—2 of Figure 1;

Figures 3, 4, and 5 are perspective views showing several separate elements of the structure;

Figure 6 is an enlarged section showing the construction of cap for the conductor.

As shown, A is the stationary steering post; B is the rotary steering stem therein, and C is the hub portion of the steering wheel to which the rim portion (not shown) may be attached by any suitable means, such as the resilient spokes D. This hub portion has a tapering socket E which fits upon a correspondingly tapered upper end portion of the stem B, being secured in position by a nut F engaging a threaded portion G of the stem and having a spline H for transmitting the torque from the hub to the stem. The hub C is also flared in an upward direction and is recessed on its upper side forming a surrounding annular flange I.

Within the recess in the hub are arranged the elements for forming the circuit closure or switch through which the horn is operated. These include a cup-shaped sheet metal stamping J which is centrally apertured at J' to fit about the threaded portion G of the stem B being clamped in position by the nut F. At the upper end of the member J is an outwardly extending flange J² and just below this flange at distributed points in the cylindrical portion of the cup are slots J³ for a use that will be hereinafter explained. The member J also has a series of struck-up lugs J⁴ in the bottom portion thereof which surround and are equidistant from the axis of the cup. K is another cup-shaped stamping which is placed within the member J in inverted position, the lugs J⁴ engaging a lower peripheral flange K' and thereby centering the member with respect to the hub. The web of this cup K extends over the stem B and nut F and has formed centrally thereof a depressed portion forming a circular recess K², while at one side of this recess is a circular aperture K³ of slightly larger diameter with a slot K⁴ extending therefrom to the center of the recess K². L is the insulated conductor which passes upward through the hollow stem B and at its upper end is provided with a cap member M having a portion M' for surrounding the insulation, a portion M² which is clamped and preferably soldered to the end of the conductor, and an annular base flange M³. Beneath this flange and sleeved on the conductor L is an insulator washer L' which is adapted to fit within the circular recess K² and to be held thereby and centralized with respect to the member K. However, the circular aperture K³ is of sufficient size to permit the passage therethrough of the flange M³ and washer L'. Thus in assembling the parts the member K may be placed in position within the member J and above the washer L' and flange M³, after which the conductor L may be moved laterally to a point where said flange and washer will pass through the aperture K³, and then back to engage the recess K².

N is a resilient contact member, the central portion of which engages the flange M³, while its periphery is arranged above the marginal portion K⁵ of the member K which is raised slightly above the level of the central portion containing the recess K². Preferably, this member N is formed with a series of radially inwardly projecting spaced fingers N' with V-shaped inner end portions N² which rest upon the flange M³, said fingers N' being inclined slightly downward toward the center so as to raise the peripheral portion N³ above the portion K⁵ of the member K. O is a member formed of insulating material, preferably some synthetic compound, such as "Tenite", which may be molded into the desired form. The periphery of the member O has a slightly depending flange O' which fits within the flange I of the hub C. There is also a depending cylindrical flange portion O² surrounding a central aperture in the member O and provided with an annular ledge or shoulder O³ for contacting with the portion N³ of the member N with a further depending flange O⁴ surrounding the member K and slightly spaced therefrom. The member O is further provided in the flange portion O² with a series of shoulders O⁵ for engaging a locking member and coresponding in position to the slots J³ in the member J. It is important to accurately locate these shoulders and to facilitate this, they are formed in alignment with apertures O⁶ through the top of the member O and at the bottom of recesses or grooves $O^7$ in the outer surface of the flange $O^2$. This permits of molding in these apertures $O^6$, recesses $O^7$ and the shoulders $O^5$ by pins which project from the top member of the mold and without the use of cores or detachable parts of the mold. The member O is further provided in its upper face with a circular groove $O^8$ which surrounds the apertures $O^6$ and is adapted to receive the depending flange of a cover or an escutcheon plate P. This latter member may be of any suitable design having a depending flange P' for engaging the groove $O^8$ and a plurality of fingers $P^2$ passing through slots in alignment with said groove and bent into clinching engagement with the underside of the member O. Q is a locking member, preferably formed of resilient wire and fashioned to fit about the cylindrical portion of the member J beneath the flange $J^2$. The member Q has formed therein inwardly projecting loops Q' which register with the slots $J^3$ and project therethrough for engagement with the shoulders $O^5$ of the member O to lock the latter in position. To facilitate this engagement the flange $O^2$ of the member O is provided with a series of grooves $O^9$ in its outer surface adapted to be registered with the loops Q' of the member Q. Thus, by first engaging the member O with the loops Q' entering the grooves $O^9$ it may be depressed until the shoulder $O^3$ engages the portion $N^3$ of the member N. By then depressing the member O slightly further against the resilient member N and turning it about its axis, the loops Q will be forced out from the grooves $O^9$, and after further turning will enter the grooves $O^7$ above the shoulders $O^5$. Thus the shoulders $O^5$ which are very accurately located in the member O will form in connection with the loops Q' a stop for limiting the upward movement of the member O. The stop is so located that the resilient member N will be under compression while the periphery of this member will be spaced a predetermined distance from the peripheral portion $K^5$ of the member K. Furthermore, as the resilient arms N' are all under equal tension, this will hold the portion $N^3$ equally spaced from the portion $K^5$ on all sides.

With the construction as above described, to assemble the parts, after the steering wheel has been placed in engagement with the tapered portion of the steering stem B, the member J having the locking member Q engaged therewith, is placed in the recess in the hub and is secured by the nut F which clamps the portion surrounding the aperture J' against the hub. The member K is then positioned in engagement within the lugs $J^4$, after which the insulated conductor L which has been previously provided with the cap M and washer L' and placed within the stem B, is positioned by passing the cap and washer through the aperture $K^3$ and then engaging with the recess $K^2$. The member N is next placed in position with the fingers N' resting upon the flange $M^3$. The member O is next engaged with the member J, the grooves $O^9$ being registered with the loops Q' of the locking member Q, after which said member O is pressed downward and turned to engage the loops Q' above the shoulders $O^5$. The cover or escutcheon plate P may be secured to the member O before assembly of the latter and not only covers the central opening, but also the apertures $O^6$. Thus, after locking the member O the assembly is complete.

In operation, the member K being seated upon the member J which is attached to the steering stem forms the electrically grounded contact member while the member N, together with the cap M being supported on the insulator washer L', forms the other contact member normally spaced from the member K by the resiliency of the arms N'. However, either a rocking movement of the member O or the depression of the whole member will bring some portion of the peripheral portion $N^3$ of the member N into contact with the grounded member K, thereby closing the circuit and operating the horn. By reason of the fact that all of the members are die-formed, they are very accurately positioned in relation to each other so that the space between the member N and the grounded member K may be reduced to the minimum without danger of short circuiting. Consequently, a very slight movement of the member O will be sufficient to close the circuit and to sound the horn.

What I claim as my invention is:

1. The combination with a steering wheel hub having a recess in its upper portion, of a circuit closing switch comprising an annular member within said recess forming a grounded contact, a centrally arranged insulated contact member, a resilient bridge contact member supported on said central contact member and having an annular portion registering with and normally spaced from said grounded contact member, a button forming a closure for said recess supported on said resilient contact member, and means for limiting the outward movement of said button to provide a predetermined space between the registering portions of said bridge contact member and grounded contact member.

2. The combination with a steering wheel hub having a recess in its upper portion, of a circuit closing switch comprising an annular member within said recess forming a grounded contact, a centrally arranged insulated contact member, a resilient bridge contact member supported on said central contact member and having an annular portion registering with and normally spaced from said grounded contact member, an annular member surrounding said bridge contact member, a button forming a closure for said recess having a depending portion within said surrounding annular member supported on the marginal portion of said resilient bridge contact member, and also having upwardly facing shoulders, and a member extending radially inward from said surrounding annular member to engage said upwardly facing shoulders to limit the outward movement of said button and to provide a normal predetermined space between said bridge contact member and grounded contact member.

3. The combination with a steering wheel hub having a recess in its upper portion, of a circuit closing switch comprising an annular member secured within said recess concentric with said hub, a button forming a closure for said recess and having an annular portion projecting downward within said annular member and with a series of recesses therein providing upwardly facing shoulders, circuit closing means within said annular member operated by and resiliently supporting said button and including normally spaced annular contact members, and a locking member secured to said annular member having radially inwardly projecting portions for engaging said shoulders to limit the upward movement of said button and to normally hold said annular contact members uniformly spaced but in close proximity.

4. The combination with a steering wheel hub having a recess in its upper portion, of an annular member within said recess having an outwardly extending flange at its upper end and a plurality of apertures therethrough beneath said flange, a button forming a closure for said recess having an annular portion projecting downward within said annular member and provided with recesses having upwardly facing shoulders registering with the apertures in said annular member, circuit closing means within said annular member operated by and resiliently supporting said button, a resilient locking member surrounding said annular member beneath the flange thereof having portions extending radially inwardly through said apertures into engagement with said shoulders to limit the outward movement of said button, and means for expanding said locking member upon the insertion of said button to engage said inwardly extending portions with said recesses and shoulders.

5. The combination with a steering wheel hub having a recess in its upper portion, of an insulated contact member within said recess, an inverted cupped member surrounding said insulated contact member having a marginal annular portion forming a grounded contact, an eccentric aperture for the passage of said insulated contact member therethrough, and a central depressed socket portion for receiving said insulated contact member, a resilient bridge contact member centrally supported on said insulated contact member and having an outer portion registering with said annular grounded contact member and normally spaced therefrom, a button for closing said recess supported on said resilient bridge contact member, and means for limiting the outward movement of said button to predetermine the space between said resilient bridge contact member and grounded contact member.

6. The combination with a steering wheel hub having a recess in its upper portion, of circuit closing means within said recess, a button forming a closure for said recess resiliently supported on said circuit closing means and forming an operator therefor, and means for engaging said button and limiting its outward movement comprising, an annular flange depending from said button having a plurality of recesses in its outer face with upwardly facing shoulders, said recesses registering with apertures through said button permitting the accurate positioning of said shoulders, an annular member within said recess surrounding said depending annular flange having a radially outwardly extending flange at its upper end and apertures beneath said flange registering with said recesses, and a resilient loop surrounding said annular member having radially inwardly projecting portions extending through said apertures into engagement with said recesses and shoulders, entering slots in said depending annular portion of the button permitting the insertion of the latter into engagement with said inwardly projecting portions of said resilient loop, whereby the turning of said button after initial engagement thereof will expand said loop and permit engagement of the inwardly projecting portions thereof with said recesses and shoulders.

7. The combination with a steering wheel hub having a recess in its upper portion, of a circuit closing switch comprising an annular member secured within said recess concentric with said hub, a button forming a closure for said recess and having an annular portion projecting downward within said annular member, said button being provided with a series of apertures therethrough extending downward into said annular portion and terminating in exactly positioned upwardly facing shoulders, and a resilient locking means surrounding said annular member having inward projections for engaging said recesses and cooperating with said shoulders to form limiting stops for the upward movement of said button.

8. The combination with a hollow steering stem, a steering wheel hub mounted thereon and having a recess in its upper portion into which said steering stem projects, a clamping nut in said recess for securing said hub to said stem, and an insulated conductor passed through said hollow stem into said recess, of a circuit closing switch comprising a cup-shaped member in said recess clamped by said nut to said hub having an outwardly extending flange at its upper end and provided with a plurality of spaced apertures beneath said flange, a button forming a closure for said recess having an annular portion extending downward into said cupped member with recesses therein registering with said apertures having upwardly facing shoulders, a resilient locking member surrounding said cup-shaped member having portions projecting through said apertures into the registering recesses and in engagement with said shoulders, and circuit closing means within said cupped member operated by said button.

9. The combination with a hollow steering stem, a steering wheel hub mounted thereon and having a recess in its upper portion into which said steering stem projects, a clamping nut in said recess for securing said hub to said stem and an insulated conductor passed through said hollow stem into said recess, of a circuit closing switch comprising a cup-shaped member in said recess clamped by said nut to said hub having an outwardly extending flange at its upper end and provided with a plurality of spaced apertures beneath said flange, a button forming a closure for said recess having an annular portion extending downward into said cupped member with recesses therein registering with said apertures having upwardly facing shoulders, a resilient locking member surrounding said cup-shaped member having portions projecting through said apertures into the registering recesses and in engagement with said shoulders, an inverted cupped member within the aforesaid cupped member covering said nut and having its marginal portion forming the grounded contact of a circuit closure, a contact member connected with said insulated conductor and having an insulator support centrally upon said inverted cupped member, and a resilient contact member centrally resting on said insulated contact member and marginally engaging said button in normally slightly spaced relation to said grounded contact member, whereby a slight pressure on said button will close said contacts.

10. The combination with a hollow steering stem, a steering wheel hub mounted thereon and having a recess in its upper portion into which said steering stem projects, a clamping nut in said recess for securing said hub to said stem and an insulated conductor passed through said hollow stem into said recess, of a circuit closing switch comprising a cup-shaped member in said recess clamped by said nut to said hub having an outwardly extending flange at its upper end and provided with a plurality of spaced apertures beneath said flange, a button forming a closure for said recess having an annular portion extending downward into said cupped member with recesses therein registering with said apertures having upwardly facing shoulders, a resilient locking member surrounding said cup-shaped member having portions projecting through said apertures into the registering recesses and in engagement with said shoulders, an inverted cupped member within the aforesaid cupped member covering said nut and having its marginal portion forming the grounded contact of a circuit closure, a contact member connected with said insulated conductor and having an insulator support centrally upon said inverted cupped member, and a resilient contact member centrally resting on said insulated contact member and marginally engaging said button in normally slightly spaced relation to said grounded contact member, whereby a slight pressure on said button will close said contacts, said inverted cupped member being provided with an eccentric aperture for the passage therethrough of said central contact and insulator support and having a central recess for engaging said insulator support.

11. The combination with a steering wheel including a recessed hub, a hollow stem projecting into said recess and a nut engaging said projection for clamping said hub on said stem, of a circuit closing switch within said recess including an insulated conductor extending through said hollow stem, a cap electrically connected to the upper end of said conductor having a flange projecting laterally therefrom, and an inverted cup-shaped member for enclosing said nut being provided with an eccentric aperture for the passage therethrough of said cap and flange, and a slot extending from said aperture to the center of said cup for the passage of said insulated conductor, whereby said cap is supported by said inverted cup and arranged in concentric relation thereto.

12. The combination with a steering wheel including a recessed hub, a hollow stem projecting into said recess and a nut engaging said projection for clamping said hub on said stem, of a circuit closing switch within said recess including an insulated conductor extending through said hollow stem, a cap electrically connected to the upper end of said conductor having a flange projecting laterally therefrom, an insulator washer on said conductor beneath said flange, and an inverted cup-shaped member surrounding said nut having an annular portion constituting a grounded contact, an eccentric aperture for the passage of said cap, flange and insulator therethrough with a slot extending from said aperture to the center of the cup, and a recess surrounding said center whereby said insulator washer may be engaged with said recess to support said cap and flange on said inverted cup in concentric relation thereto.

13. The combination with a steering wheel including a recessed hub, a hollow stem projecting into said recess and a nut engaging said projection for clamping said hub on said stem, of a circuit closing switch within said recess including an insulated conductor extending through said hollow stem, a cap electrically connected to the upper end of said conductor having a flange projecting laterally therefrom, an insulator washer on said conductor beneath said flange, an inverted cup-shaped member surrounding said nut having an annular portion constituting a grounded contact, an eccentric aperture for the passage of said cap, flange and insulator therethrough with a slot extending from said aperture to the center of the cup, and a recess surrounding said center whereby said insulator washer may be engaged with said recess to support said cap and flange on said inverted cup in concentric relation thereto, a bridge contact member having an annular portion registering with said annular grounded contact, and radially inwardly projecting spring arms engaging said cap and flange, and a button supported on said bridge contact member for depressing the same into engagement with said grounded contact.

HARPER E. PULLEYBLANK.